(12) United States Patent
Williams et al.

(10) Patent No.: US 7,832,479 B2
(45) Date of Patent: Nov. 16, 2010

(54) POLYMERIC EXTENDERS FOR FLEXIBLE CEMENT

(75) Inventors: Robert Williams, Houston, TX (US); Emmanuel Therond, Houston, TX (US); Terry Dammel, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/125,661

(22) Filed: May 22, 2008

(65) Prior Publication Data

US 2009/0288831 A1     Nov. 26, 2009

(51) Int. Cl.
*E21B 33/138*     (2006.01)
(52) U.S. Cl. ........................... 166/295; 166/283
(58) Field of Classification Search ............. None
See application file for complete search history.

(56) References Cited

U.S. PATENT DOCUMENTS

| | | | | |
|---|---|---|---|---|
| 5,309,995 A | * | 5/1994 | Gonzalez et al. ............ | 166/284 |
| 6,645,288 B1 | * | 11/2003 | Dargaud et al. ............. | 106/696 |
| 7,402,204 B2 | * | 7/2008 | Le Roy-Delage et al. ... | 106/724 |
| 2005/0034863 A1 | * | 2/2005 | Dillenbeck et al. .......... | 166/285 |

FOREIGN PATENT DOCUMENTS

WO    WO 0037387 A1 * 6/2000

* cited by examiner

*Primary Examiner*—Zakiya W. Bates
(74) *Attorney, Agent, or Firm*—David Cate; Robin Nava; Jeff Griffin

(57) ABSTRACT

A flexible cement stable at high temperatures contains an extender that is a finely ground polyetheretherketone. The cement retains its flexibility for long times at high temperatures, for example those used for steam assisted gravity drainage of heavy oil formations, for example from about 480 to about 644° F. (249 to 340° C.). Compressive strength, tensile strength, permeability and porosity are all stable and suitable for high temperature down-hole oilfield use.

10 Claims, 5 Drawing Sheets

POLYMERIC EXTENDERS FOR FLEXIBLE CEMENT

BACKGROUND

The statements in this section merely provide background information related to the present disclosure and may not constitute prior art.

Primary cementing in a cased oil, gas, or water well is the process of placing cement in the annulus between the casing and the formations through which the wellbore passes. The major objective is to provide zonal isolation, which is the prevention of fluid flow between different formation layers. Various materials may be added to the cement to enhance the performance and/or to improve the economics. Recent development of heavy oil reserves using heat (for example using steam) have placed additional stresses on the cement sheath, which may compromise the zonal isolation achieved with existing cement slurries.

Steam injection methods have been implemented to maximize recovery of heavy oil deposits in many fields worldwide. Several approaches have been used during cement placement in steam injection wells, including conventional and foamed cement, lightweight cement, and flexible cement composites. Laboratory experiments have shown that foam and lightweight cement composites both demonstrate a lower average Young's modulus than conventional cement. However, mechanical stress simulations predict failure of foam and lightweight cement systems in the typical steam injection environment. In these simulations, cement failure occurred under traction and/or compression, with the fracture propagating in the direction of the principle, radial stress, due to expansion or compression of the inner casing and due to Mohr-Colomb forces acting on the cement. Current cement composites that contain extenders that also provide set cement flexibility are not stable at the high temperatures at which steam is used in some heavy oil recovery wells. Although typical flexible cement composites (TFCC) were designed to distribute downhole stresses more evenly than conventional, foamed, or lightweight cements, they cannot withstand temperatures greater than about 550° F. (288° C.), which are typically associated with steam injection. Rapid degradation would occur after exposure to these temperatures. Extenders that can provide flexibility after extended exposure to high-pressure steam would be desirable.

SUMMARY

One embodiment is a cement that has an additive containing finely ground polyetheretherketone. The cement may have a polyetheretherketone content of from 10 to 40% BVOB, preferably from 20 to 30% BVOB. The additive is present in a particle size range of from about 1 to about 1000 microns.

Another embodiment is a method of cementing a cased well penetrating a subterranean formation. The method involves preparing a cement containing finely ground polyetheretherketone, and injecting this cement into the annulus between the casing and the formation. The well may subsequently be subjected to temperatures up to about 600° F. (316° C.) or even up to 644° F. (340° C.). The cement may be cooled to temperatures as low as minus 10° C., this step can also be done after the well be subjected to temperatures up to about 600° F. (316° C.) or even up to 644° F. (340° C.).

Yet another embodiment is a method of squeeze cementing a well penetrating a subterranean formation. The method involves preparing a cement that includes finely ground polyetheretherketone and injecting the cement into the well at a pressure sufficient to force the cement into a subterranean void. The well may subsequently be subjected to temperatures up to about 600° F. (316° C.) or even up to 644° F. (340° C.). The cement may be cooled to temperatures as low as minus 10° C., this step can also be done after the well be subjected to temperatures up to about 600° F. (316° C.) or even up to 644° F. (340° C.).

DETAILED DESCRIPTION OF ILLUSTRATIVE EMBODIMENTS

Figure 1:
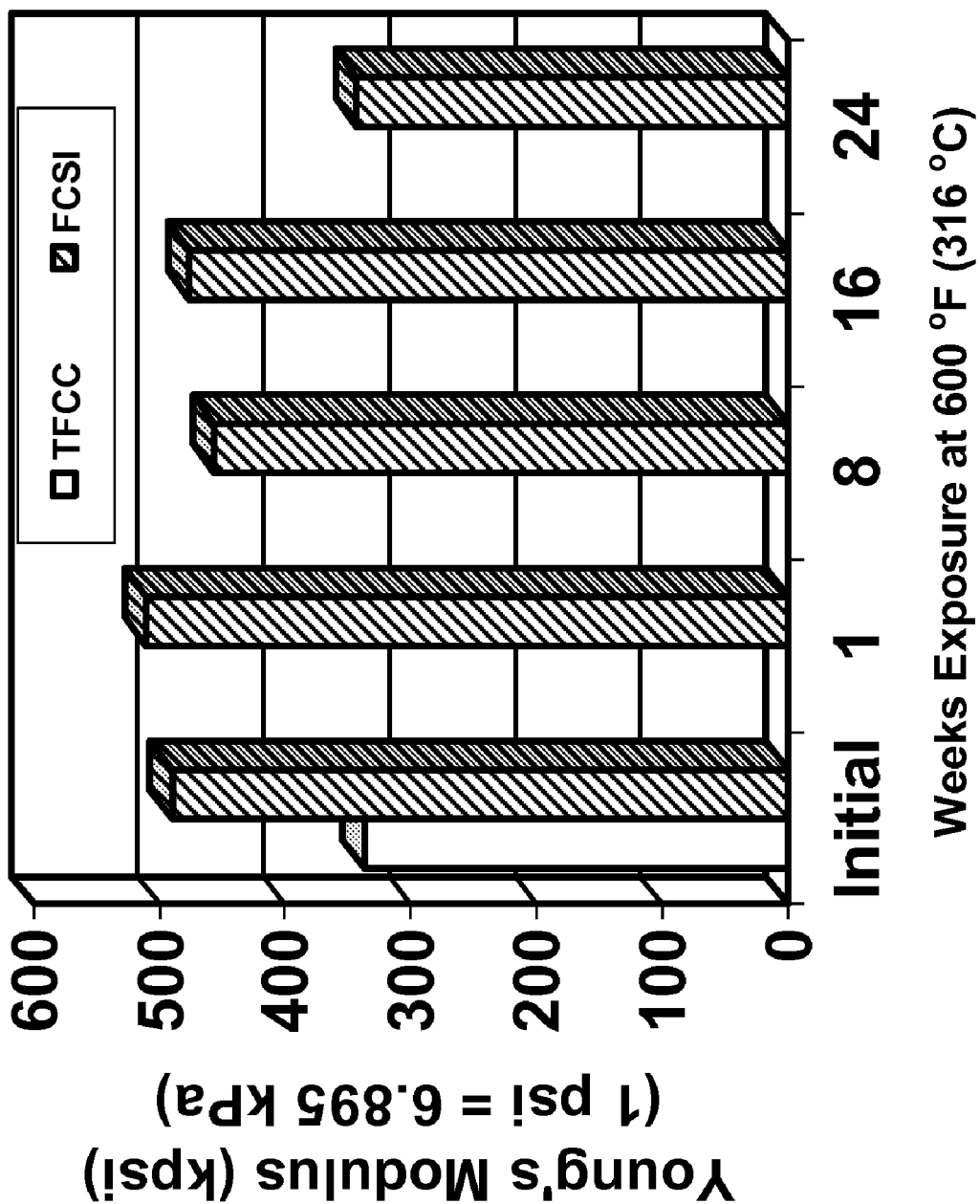
FIG. 1 shows the Young's Modulus vs. time for a typical flexible composite and for a flexible cement system.

Although the following discussion emphasizes cementing in steam-treatment wells, the cement additive and methods may be used in cementing or fracturing any wells in which stable flexible cement is needed. The invention will be described in terms of treatment of vertical wells, but is equally applicable to wells of any orientation. The invention will be described for hydrocarbon production wells, but it is to be understood that the invention may be used for wells that are producing other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated embodiments, and that such further applications of the principles of the invention as illustrated therein as would normally occur to one skilled in the art to which the invention relates are contemplated and protected.

Heavy Oil development using recovery methods such as cyclic steam stimulation or steam assisted gravity drainage (SAGD) typically involves exposing the heavy oil formations to steam temperatures ranging, for example, from about 480 to about 644° F. (249 to 340° C.). In SAGD, the operator typically drills two horizontal wells, one above the other. The upper, steam injection, well heats the reservoir. As the heavy oil reservoir is heated, the oil begins to drain into the lower, producing well. Depending on well and field conditions, it either flows freely to the surface or is assisted by surface pumping equipment. Steam injection is also used in "Huff and Puff" wells, in which injection and production occur cyclically in the same well. Requirements for these wells, in terms of demands placed on the cement sheath, may be even more strenuous than SAGD. Geothermal wells are exposed to temperature cycling that may attain maximum temperatures exceeding 550° F. (288° C.). The high temperatures in these environments can cause the cement sheath in the well to fail, causing zonal isolation to be lost.

The flexible cement system (FCS) containing Portland cement and Poly Ether Ether Ketone (PEEK® registered trademark of Victrex plc, Lancashire, UK) demonstrates superior mechanical properties in high temperature, steam-injection environments, when compared to other flexible or foamed cement composites. Among the benefits achieved by PEEK® are: improved flexibility achieved at lower concentrations than typical flexible composite systems; acceptable compressive and tensile strengths even at elevated temperatures (up to about 644° F. (340° C.)); low permeabilities (for example about 0.1 mD); and high resistance to connate brines and reservoir fluids. One of the applications of FCS is to provide long-term zonal isolation in wells experiencing wide temperature and pressure fluctuations. In addition, in some steam assisted gravity drainage (SAGD) and 'huff and puff' wells, rubber seals are used at the surface to prevent steam and other reservoir fluids from leaking to the surface. However, these seals usually begin to leak within the first two years and have to be replaced. FCS can replace these seals, preventing the long-term cost of replacement and added downtime. In addition, by placing FCS near the producing interval, more steam will be allowed to penetrate into the reservoir and less steam will be lost to the annulus and to the surface. This reduces steam costs over the lifetime of the well. FCS (the flexible cement system of the Invention) may be used in any high-temperature environment where downhole conditions require a cement system with enhanced flexibility and thermal/chemical stability. Examples include external casing packer fill-up, annular o-rings, and other techniques using cement as a secondary barrier used in conjunction with a mechanical barrier in the heavy oil environment above 500° F. (260° C.). An additional benefit is that PEEK® is highly resistant to attack from downhole brines and liquid hydrocarbons.

FCS handles downhole stresses more effectively than conventional cements, and is designed to be stable at temperatures up to 644° F. (340° C.). The addition of PEEK® (for example typically at concentrations of about 20 to 30% BVOB) imparts flexibility to the cement and provides better resistance to external stresses. The Young's modulus of these systems is comparable to that of other flexible cement composites (less than about 500,000 psi (3447 MPa)) and can be precisely engineered according to formation and flexibility requirements.

Some embodiments are designed to improve cement composite flexibility significantly, at steam-injection temperatures (for example up to about 644° F. (340° C.)), independent of cement type and over a wide range of densities. PEEK® is preferably present in the range of about 20-30% BVOB. Cement blends incorporating a broader range of PEEK® (10 to 40% BVOB may be used, but may not be optimal due to reduced flexibility when approaching 10% BVOB and increased theological properties when approaching 40% BVOB. Other optional but common additives present in the blend may include a polyvinyl chloride fluid loss additive (for example at about 0.2 to 0.3% BWOB (by weight of blend)), polysulfonate dispersant (for example at about 0.2 to 0.6% BWOB), and various other retarders (for example lignosulfonate, short-chain purified sugars with terminal carboxylate groups, and other proprietary synthetic retarder additives). Any oilfield cement may be used. Preferred cements include API Class G, API Class H, cement classed as General Utility (GU) cement similar to ASTM Type 10, and High Early similar to ASTM type 30. The cement blend may also contain gypsum in addition to that added by the cement manufacturer.

In nearly all FCS formulations, silica is added (for example at about 35 to 45% BWOB) to prevent strength retrogression in downhole applications where temperatures may exceed 230° F. (110° C.). Other additives, such as hematite or barite, may be used to optimize rheological properties or density. For most formulations, hematite or barite will not exceed 25% BWOB. Other extenders, such as microspheres, may be used over a wide concentration range to decrease density.

Although flexible cement has been described in terms of its use and advantages at the high temperatures encountered for example in steam injection, it is to be understood that the flexible cement is in fact stable and useful at lower temperatures. Typically it is used at ambient surface temperatures of about 40 to 86° F. (5 to 30° C.) and then may be heated to temperatures up to 644° F. (340° C.). However, the flexible cement may be placed in deepwater and permafrost at temperatures as low as about −14° F. (10° C.) and then heated. In fact, the cement may be used in places where it will see only low temperatures, for example in deepwater or permafrost when the well will not subsequently be subjected to steam treatment. The flexible cement may also be used for squeeze cementing operations, for example remedial cementing operations designed to force cement into voids, such as leak paths in wellbore tubulars, to repair poor primary cement jobs, to isolate perforations or to repair damaged casing or liner.

EXAMPLES

Sample Preparation

Core samples were mounted in pressure cells and placed in a high temperature oven. The excess space around the cores in each cell was packed with coarse sand and water. After preparation, each cell was sealed and the cores were heated to 600° F. (316° C.) to simulate steam-injection conditions. Due to heating-related expansion, the cell pressures reached approximately 2000 psi (13.8 MPa). The samples were exposed for up to 24 weeks, with measurements made at regular intervals (for example 1 week, 4 weeks, etc.). Various measurements on the core samples were taken to show trends in the development of mechanical and physical properties.

Mechanical, Porosity, and Permeability Measurements

A crush strength hydraulic press with a horizontal displacement tool was used to measure mechanical properties. Before loading core samples into the compressive crush strength hydraulic press, the physical dimensions of the samples were measured. The cores used in the compressive strength (CS) and Young's modulus testing typically had a diameter of 1.5 inches (3.81 cm) and a length of 2.0 inches (5.08 cm). The compressive strength was determined by applying an axial load to a core sample at 0.06 in/sec. The Young's Modulus was determined using a two-point slope method for each sample, utilizing a mechanical property acquisition/analysis software package. The tensile strength was determined by applying the Brazilian Tensile Test Method following procedures outlined in ASTM D3967 using the core dimensions of diameter of 1.5 inches (3.81 cm) and a length of 2.0 inches (5.08 cm). In the Brazilian Method, a load was applied along the side of the core and the tensile strength was determined using the expression:

$$TS = \frac{2F}{\pi LD} \quad (1)$$

where TS is the tensile strength, F is the maximum load applied along the length of the core, and D and L are the diameter and length of the core, respectively.

Before the porosity measurements, sample dimensions were determined with a caliper. The core dimensions used in porosity and permeability measurements were typically diameter=1.0 inch (2.54 cm), and length=1.0 inch (2.54 cm). A core saturated with water was first weighed suspended in water and then removed from water and weighed again. The core was dried in an oven at 200° F. (93° C.) for 24 hours and the dry weight suspended in water was determined. The porosity was determined using Archimedes Principle:

$$\phi = \frac{Weight\_Dried\_Core\_in\_Water}{Weight\_Wet\_Core\_in\_Water} \quad (2)$$

or the ratio of the weight of the dried core in water to the weight of the saturated core in water. The permeability was measured using a modified fluid loss cell with a specialized fitting for the core sample. Pressure was varied in order to initiate flow. The permeability was determined with Darcy's Law:

$$\gamma = 245 \frac{\mu LQ}{A \Delta P} \quad (3)$$

where γ is the permeability (millidarcies), 245 is a conversion factor, μ is the viscosity (cp), L and A are the length and area of the core, respectively (in/in²), Q is the flow rate (mL/min), and ΔP is the pressure drop (psi) thru the core.

Light Microscopy Measurements

Light Microscopy studies were performed with a Zeiss Axioskope 40 Light Microscope at 100× magnification. Several images of each sample were obtained in different viewing planes. A composite 2D image was generated for each sample using an image stacking utility.

Composition of FCS used in Experiments

The cement used was Portland API Class G, produced by Lafarge Cement Company, Mojave, Calif., U.S.A. The measured composition of the Class G cement was 55 wt % 3CaO·SiO$_2$ (tricalcium silicate), 22-28 wt % 4CaO.Al$_2$O$_3$.Fe$_2$O$_3$ (tetracalcium alluminoferrite), 5.0 wt % 3CaO.Al$_2$O$_3$ (tricalcium aluminate), 2.9 wt % SO$_3$, 0.8 wt % MgO, 0.55 wt % alkalies (Na$_2$O.0.66 K$_2$O), and other trace components.

The PEEK® was obtained from Victrex USA Inc, West Conshohocken, Pa. U.S.A. The grade used was 450 PF (fine powder). Polyetheretherketone, a poly aryl ether ketone, is a white odorless material having a reported melting point of 650° F. (343° C.) and a density of 1.3 g/cc; it is insoluble in water and not toxic to humans. Typical particle size is from about 10 to about 110 microns. The material used has a Melt Viscosity (MV) at 400° C. of 0.45 kN.s.m$^{-2}$.

The properties of the TFCC and FCS blends tested are summarized in Table 1. The flexible additive in the TFCC was a synthetic butadiene rubber. The long-term mechanical properties of both systems were studied at a typical steam-injection temperature (600° F. (316° C.)). The TFCC sample was completely degraded after 1-week exposure, making mechanical, porosity, and permeability measurements impossible.

TABLE 1

| Property | Typical Flexible Cement Composite (TFCC) | Flexible cement system (FCS) |
|---|---|---|
| Initial System Properties | | |
| Density: ppg (kg/m³) | 12.9 (1545) | |
| BHST: ° F. (° C.) | 130 (54) | |
| BHCT: ° F. (° C.) | 100 (28) | |
| 72 hr CS: psi (MPa) | 954 (6.58) | 1850 (12.76) |
| Slurry Properties | | |
| California Class G (% BVOB) | 31.5 | 35 |
| Fine Silica (% BVOB) | 13.5 | 40 |
| Lightweight Extender (% BVOB) | — | 24 |
| Flexible Additive (% BVOB) | 55 | — |
| PEEK ® (% BVOB) | — | 25 |
| PEEK ® SG | — | 1.3 |
| PEEK ® mean particle size (microns) | — | 102.5 |

Example 1

FCS Flexibility at Elevated Temperature (600° F. (316° C.))

The Young's modulus of the FCS remained approximately constant through 24 weeks' exposure at 600° F. (316° C.). The initial modulus was 490,000 psi (3378 MPa); after 24 weeks, the modulus was 340,000 psi (2344 MPa). The initial Young's modulus for a 12.9 ppg (1545 kg/m³) TFCC was also about 340,000 psi (2344 MPa). Although the TFCC cores were unsuitable for testing after 1 week of exposure at 600° F. (316° C.), a previous study on similar cores exposed at 550° F. (288° C.) had measured a Young's modulus of 530,000 and 410,000 psi (2827 and 3654 MPa) after 1 and 2 weeks' exposure, respectively. The current study shows that the Young's Modulus properties are similar for the FCS and TFCC, but the FCS is able to maintain these flexible properties after long periods of constant exposure at temperatures exceeding the maximum stability limit of the TFCC. The results are summarized in FIG. 1; the FCS remained more flexible than TFCC (at a lower temperature) even after 24 weeks.

Compressive Strength

Figure 2:
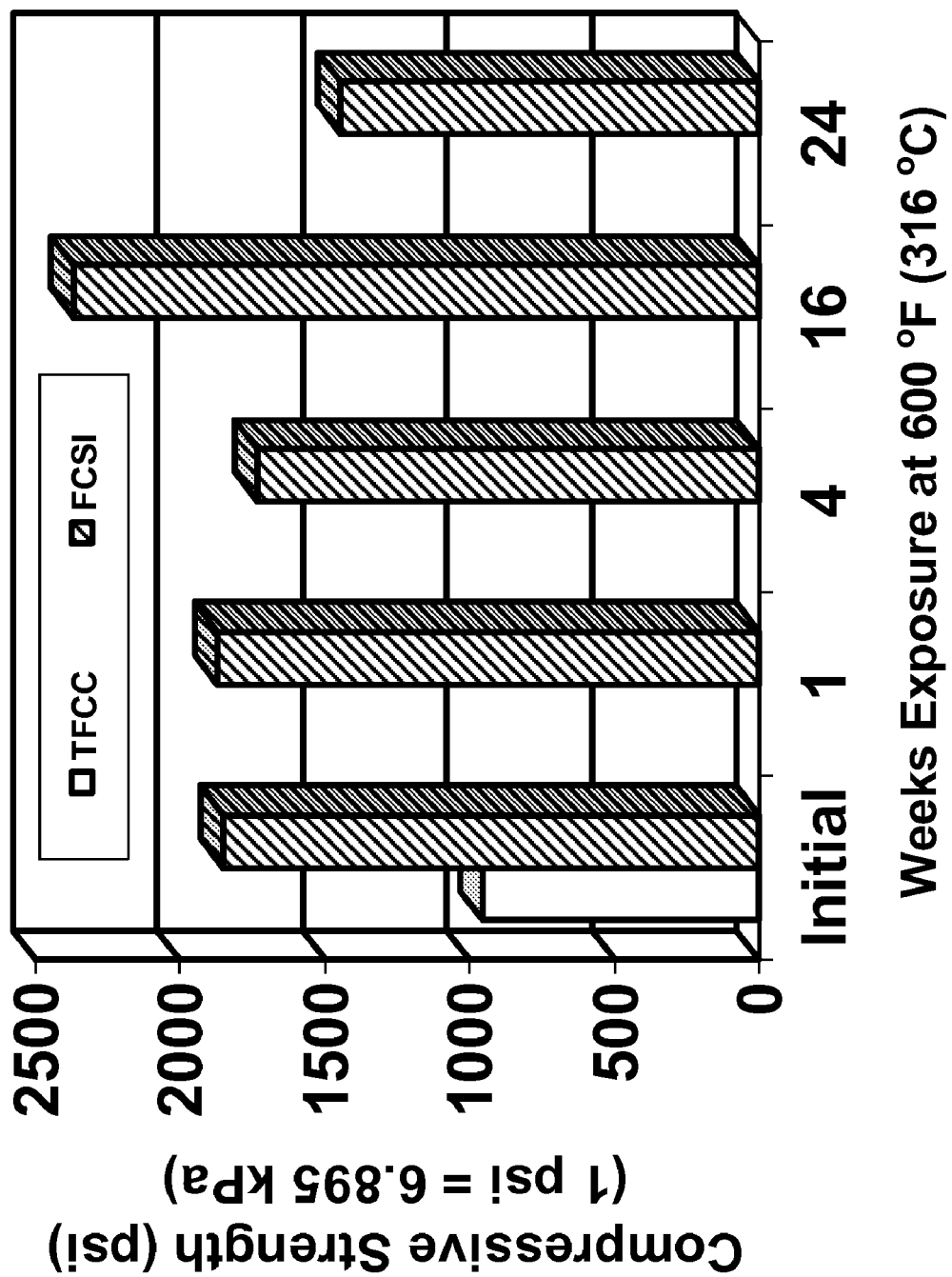
FIG. 2 shows the compressive strength (CS) vs. time for a typical flexible composite and for a flexible cement system.

From FIG. 2, it can be seen that the FCS demonstrated similar compressive strength between initial samples (1850 psi (12.76 MPa)), samples cured for 4 weeks at 600° F. (316° C.) (1760 psi (12.13 MPa)), and samples cured for 24 weeks (1448 psi (9.98 MPa)). The initial 72-hr compressive strength for the 12.9 ppg (1545 kg/m³) TFCC was 954 psi (6.58 MPa).

After a 1-week exposure to 600° F. (316° C.), TFCC samples were completely degraded, preventing any mechanical, porosity, or flow measurements. The FCS compressive strength remained approximately constant over a 24-week exposure to 600° F. (316° C.). Compressive strength results are summarized in FIG. 2.

Tensile Strength

Figure 3:
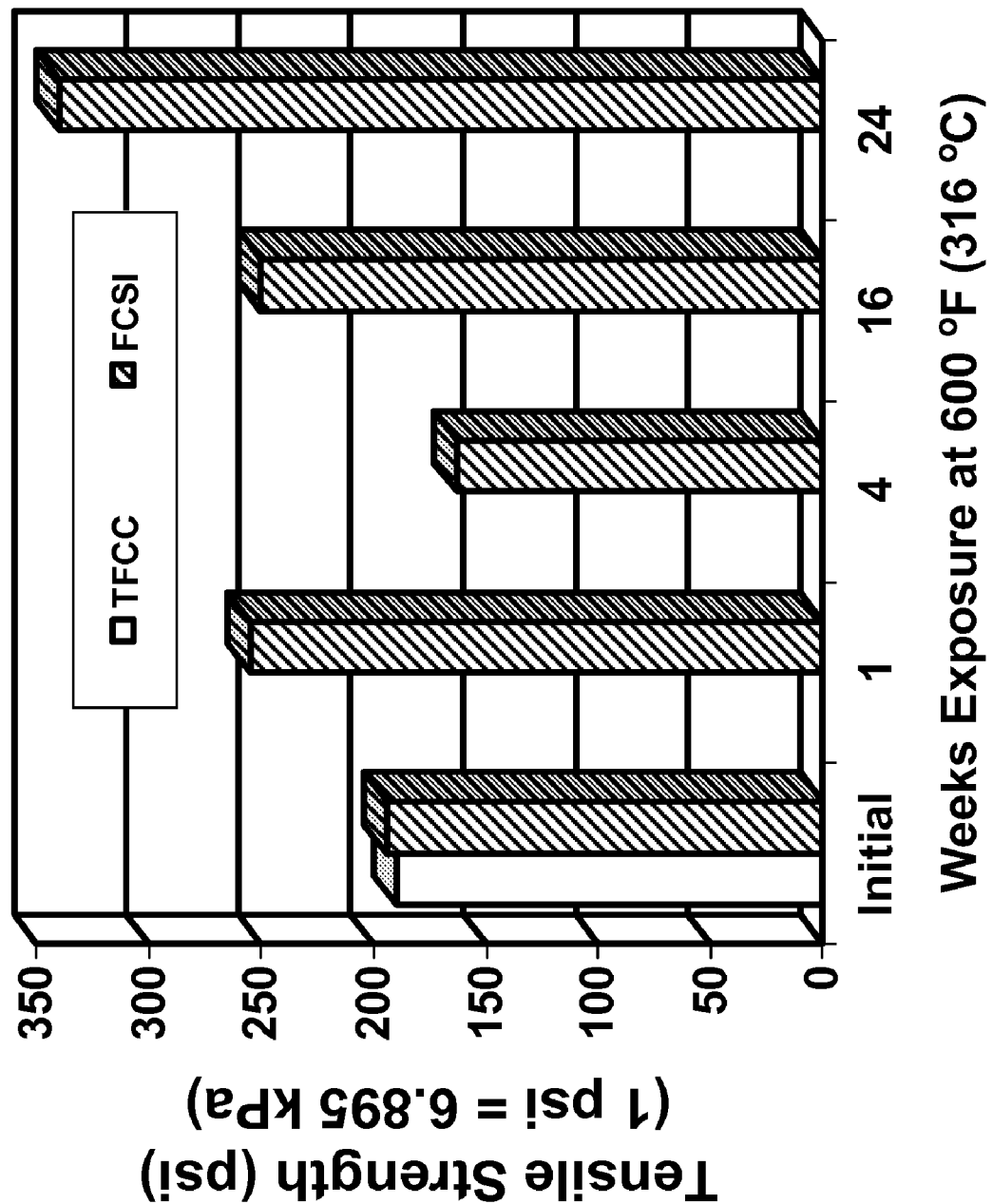
FIG. 3 shows the tensile strength (TS) vs. time for a typical flexible composite and for a flexible cement system.

FCS tensile strength measurements taken throughout the 24-week study showed tensile strengths at least 13% of compressive strengths. In previous downhole stress simulations of steam injection wells, the most stable systems have maintained a combination of improved flexibility and strong tensile strength properties. In other words, a system with very high flexibility but weak tensile properties may still fail under certain conditions. The right combination of flexibility and tensile strength is essential in a long-term zonal isolation strategy. Some embodiments impart the right combination of flexible and tensile properties to be successful under a wide and demanding range of steam injection environments. Tensile strength results are summarized in FIG. 3.

Porosity and Permeability

Figure 4:
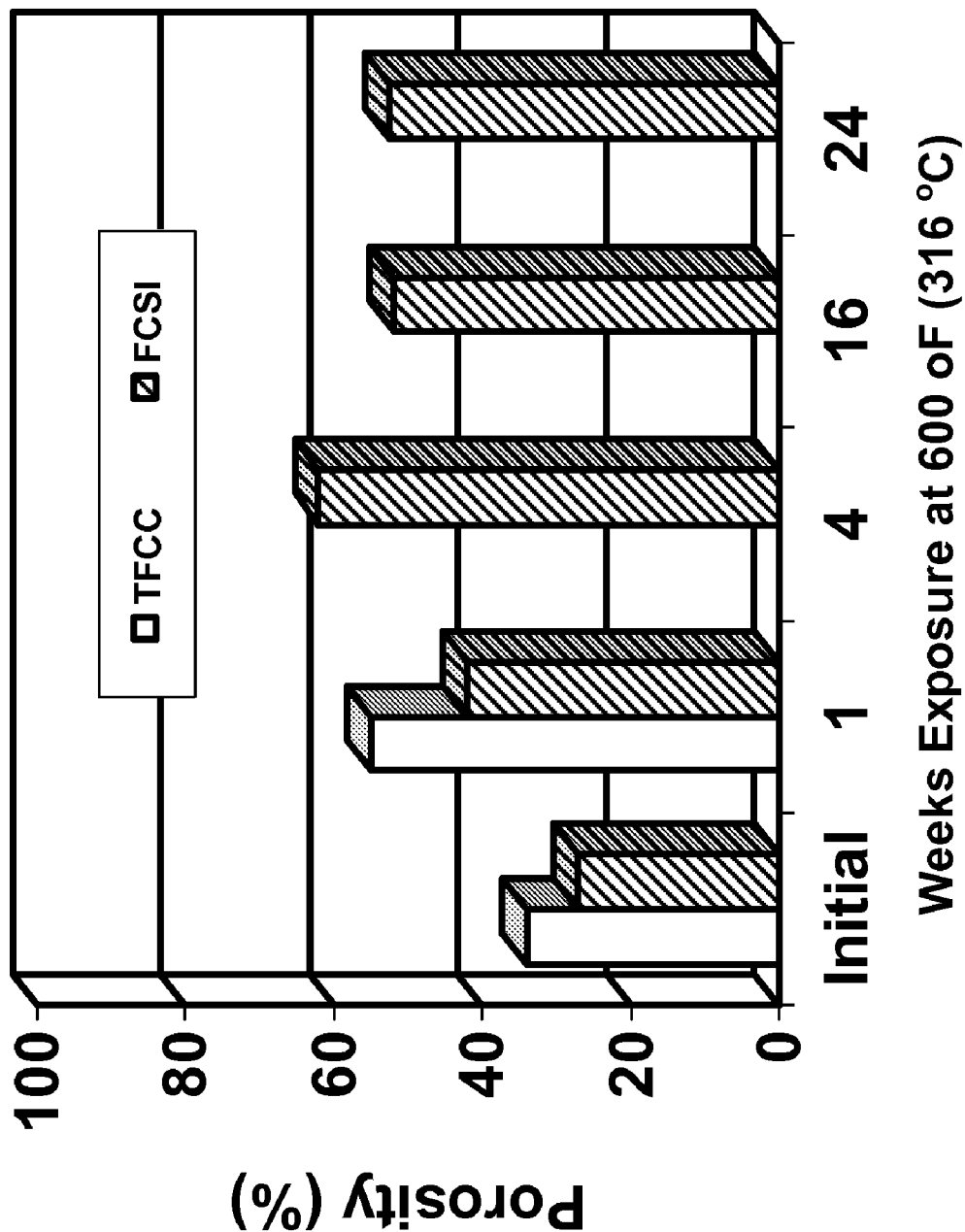
FIG. 4 shows the porosity vs. time for a typical flexible composite and for a flexible cement system.
Figure 5:
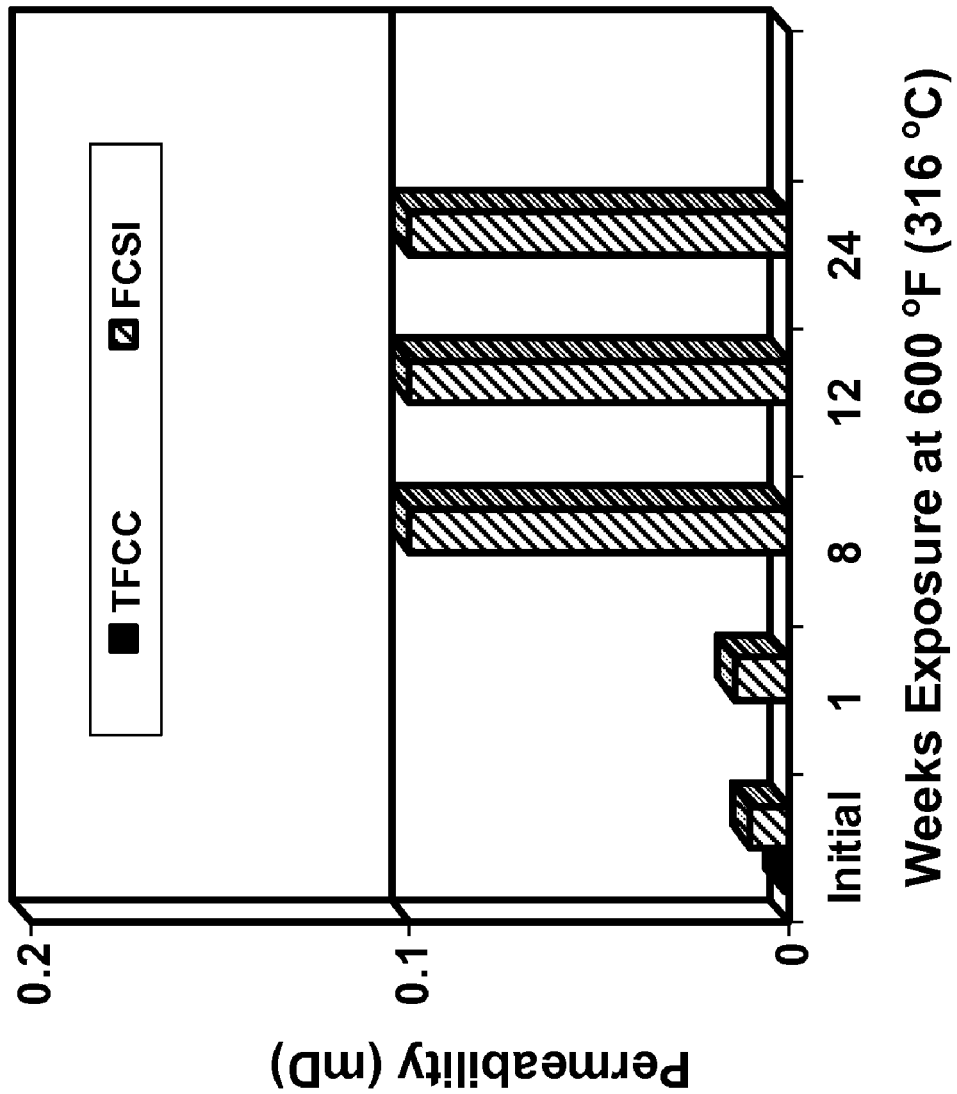
FIG. 5 shows the permeability vs. time for a typical flexible composite and for a flexible cement system.

Initial measurements indicated low porosity and permeability for both TFCC and FCS. Laboratory measurements showed that FCS porosity and permeability remained approximately constant (~52% and ~0.1 mD) even after 24 weeks exposure at 600° F. (316° C.). The initial TFCC permeability was low (~0.002 mD) but the material was too unconsolidated for measurement after a 1-week exposure at 600° F. (316° C.). Porosity and permeability results are summarized in FIG. 4 and FIG. 5.

Light microscopy analysis of the FCS surface after exposure to 600° F. (316° C.) showed little change between initial samples and samples exposed for 4 weeks at 600° F. (316° C.). The cement matrix remained well-consolidated, with negligible pitting or cracking. There was some slight PEEK® discoloration after heating.

Other Materials

Polytetrafluoroethylene, butadiene synthetic rubber, and natural rubber were all tried as high temperature flexible extenders, but were found to be unsatisfactory. The polytetrafluoroethylene marginally met the temperature requirements, but cements were unmixable and very sensitive to shear (becoming too viscous). The synthetic and natural rubber systems did not meet the temperature requirements.

While the invention has been illustrated in the drawings and foregoing description, the same is to be considered as illustrative and not restrictive in character, it being understood that only some embodiments have been shown and described and that all changes and modifications that come within the spirit of the inventions are desired to be protected. It should be understood that while the use of words such as preferable, preferably, preferred, more preferred or exemplary utilized in the description above indicate that the feature so described may be more desirable or characteristic, nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim.

We claim:

1. A method of cementing a cased well penetrating a subterranean formation comprising preparing a cement comprising finely ground polyetheretherketone, and injecting said cement into the annulus between the casing and the formation.

2. The method of claim 1 wherein the well is subsequently subjected to temperatures up to about 600 ° F. (316 ° C.).

3. The method of claim 2 wherein the well is subsequently subjected to temperatures up to about 644 ° F. (340 ° C.).

4. The method of claim 3 wherein the cement is after cooled to temperatures as low as minus 10 ° C.

5. The method of claim 1 wherein the cement is cooled to temperatures as low as minus 10 ° C.

6. A method of squeeze cementing a well penetrating a subterranean formation comprising preparing a cement comprising finely ground polyetheretherketone and injecting said cement into the well at a pressure sufficient to force the cement into a subterranean void.

7. The method of claim 6 wherein the well is subsequently subjected to temperatures up to about 600 ° F. (316 ° C.).

8. The method of claim 7 wherein the well is subsequently subjected to temperatures up to about 644 ° F. (340 ° C.).

9. The method of claim 8 wherein the cement is after cooled to temperatures as low as minus 10 ° C.

10. The method of claim 6 wherein the cement is cooled to temperatures as low as minus 10 ° C.

* * * * *